Feb. 20, 1962 J. D. KEITHAHN 3,021,902
CONTROL APPARATUS FOR SUBSURFACE WELL TOOLS
Original Filed May 19, 1958
2 Sheets-Sheet 2

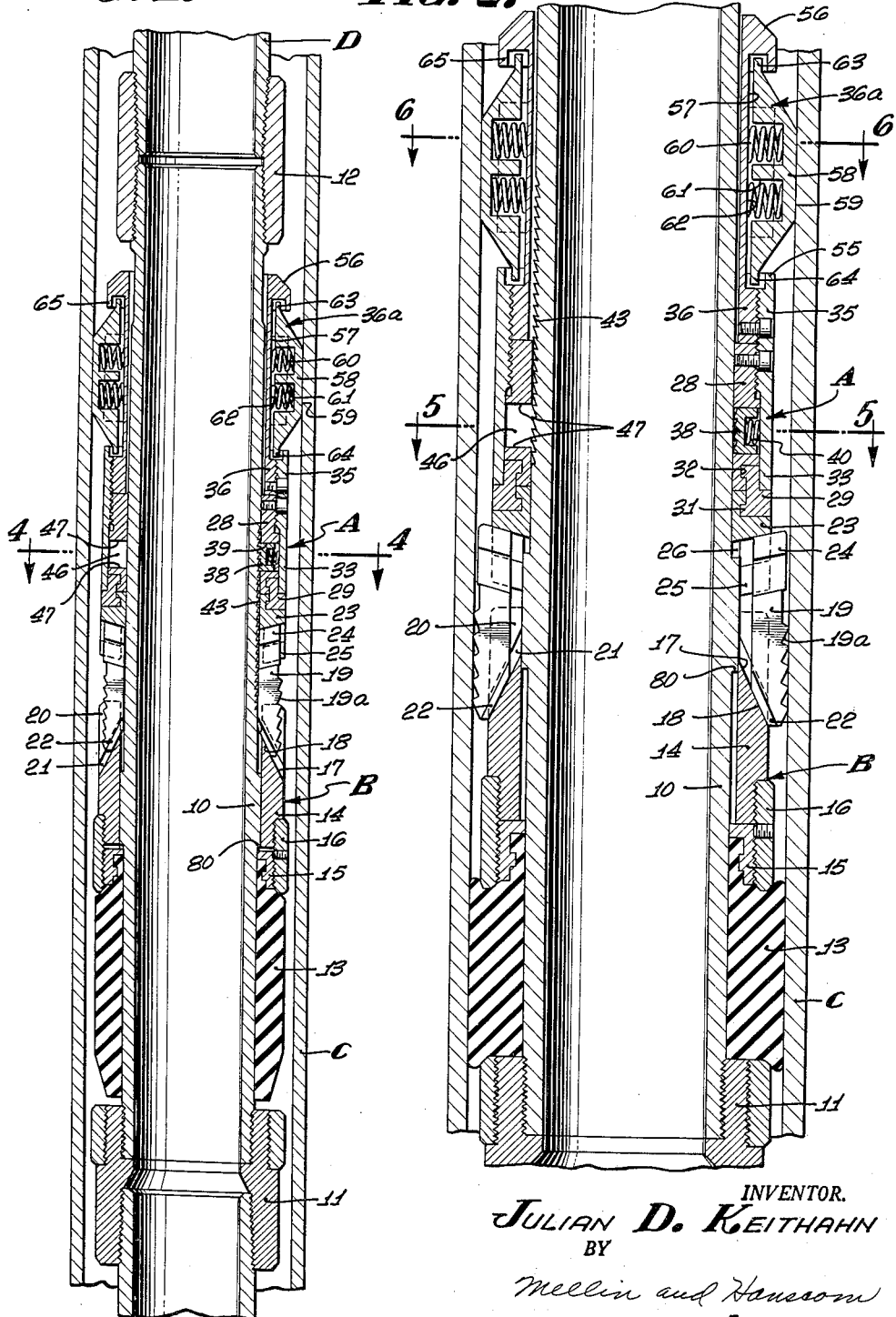

JULIAN D. KEITHAHN
INVENTOR.

BY
Mellin and Hanscom
ATTORNEYS.

United States Patent Office 3,021,902
Patented Feb. 20, 1962

3,021,902
CONTROL APPARATUS FOR SUBSURFACE
WELL TOOLS
Julian D. Keithahn, Anaheim, Calif., assignor to Baker
Oil Tools, Inc., Los Angeles, Calif., a corporation of
California
Original application May 19, 1958, Ser. No. 736,138, now
Patent No. 2,975,837, dated Mar. 21, 1961. Divided
and this application Jan. 20, 1959, Ser. No. 787,955
10 Claims. (Cl. 166—237)

The present invention relates to subsurface well bore equipment, and more particularly to control or clutch apparatus for governing the operation of the equipment in the well bore.

The present application is a division of my application for "Friction Drag Devices," Serial No. 736,138, filed May 19, 1958.

An object of the invention is to provide a well tool adapted for operation in a well bore and embodying an improved clutch device for selectively uncoupling parts to permit relative longitudinal movement therebetween, or coupling such parts for joint longitudinal movement at a plurality of longitudinal positions that the parts can occupy with respect to each other.

Another object of the invention is to provide a clutch or latch device for selectively controlling relative longitudinal movement between parts of a subsurface well bore tool, and embodying a clutch element capable of being relatively located in a position to engage clutch or ratchet teeth extending along a member or in a position to engage a smooth portion of such member, wherein the clutch element is disengaged from the member.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

FIGURE 1 is a longitudinal section through the apparatus, with its parts in retracted position, and with the clutch in engaged condition;

FIGURE 2 is an enlarged longitudinal section through the apparatus shown in FIGURE 1, with certain parts expanded against the well casing and with the clutch in disengaged condition;

Figure 3:
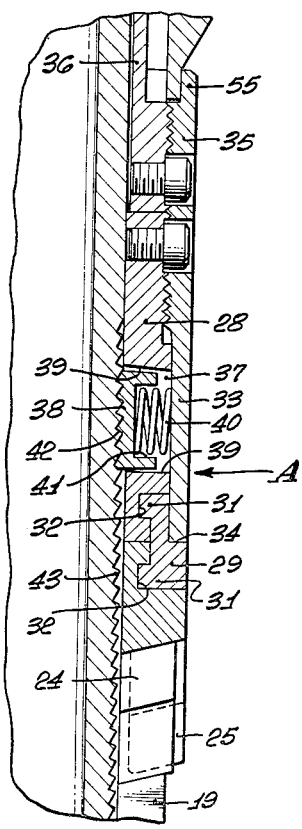
FIGURE 3 is an enlarged fragmentary longitudinal section through a portion of the apparatus.

The control unit A is illustrated in the drawings as forming part of a well packer B, which is adapted to be anchored in packed-off condition in a well casing C, being movable through the latter by means of a tubular string D, such as tubing or drill pipe, extending to the top of the well bore. It is to be understood, however, that the control unit A can be used in other relationships than the one specifically illustrated.

The well packer B shown in the drawings includes a tubular body 10, the lower end of which is threadedly attached to a lower body guide 11, and the upper end of which is threadedly attached to an upper body coupling 12, which is, in turn, threadedly secured to the lower end of the tubing string D that extends to the top of the well bore. Surrounding the body 10 of the tool is a packing structure 13, such as a rubber or rubber-like packing sleeve, the lower end of which is adapted to engage the upper end of the guide 11, and the upper end of which is secured to an expander 14, slidably mounted on the body of the tool. Any suitable mode of attachment may be used. As shown, an end ring 15 is molded to the upper portion of the packing sleeve 13, this ring being threaded within a coupling sleeve 16 threadedly secured to the lower portion of the expander 14.

The expander 14 has a plurality of circumferentially spaced expander surfaces 17 which are inclined in an upward and inward direction for engagement with companion tapered inner surfaces 18 on a set of circumferentially spaced slips 19 shiftable relative to the body 10 of the tool. These slips 19 have external wickers 19a facing in an upper direction to embed themselves in the wall of the well casing C when the expander 14 moves upwardly relative to the slips to expand the latter outwardly. To secure retraction of the slips 19 upon relative downward movement of the expander 14 with respect thereto, the slips are each interconnected to the expander by a slidable tapered spline connection. As specifically shown, the slips are mounted in slots 20 in the expander 14, the expanders having inclined grooves 21 at the sides of each slot receiving inclined tongues 22 projecting from opposite sides of each slip Thus, upon relative downward movement of the expander 14 with respect to the slips 19, after the latter have occupied an outward expanded position, the tongue and groove connection 22, 21 will result in a positive inward shifting of the slips, to place them in their retracted position.

The slips 19 are coupled together for joint movement by being secured to a slip ring 23, the slips, however, being shifted radially with respect to the ring. Such coupling and radial shifting is secured by forming the upper portions of the slips as T-shaped heads 24 shiftable within lower slots 25 within the slip ring 23, the upper portion of each head being slidable radially within the grooves 26 opening into the sides of each slot 25.

The slip ring 23 is coupled to the control unit clutch or lock device A which will determine the ability of the body 10 of the tool to move longitudinally relative to the slip ring 23 and the slips 19 themselves. The control unit or clutch device includes a clutch or control sleeve 28 coupled to the slip ring by a two-piece tie ring 29 having upper and lower flanges 31 received within upper and lower grooves 32 in the slip ring 23 and the clutch sleeve 28. This tie ring is held in assembled position by a clutch housing 33, the lower portion of which rests upon a shoulder 34 on the tie ring and encompasses the upper part of the latter. This clutch housing has an upper threaded portion 35 threadedly secured to the upper part of the clutch sleeve 28 and also threadedly secured to the lower end of the drag body 36 of a drag device 36a surrounding the packer body 10.

The clutch sleeve has an arcuate opening 37 therethrough in which a clutch segment or dog 38 is disposed that is capable of shifting radially of the sleeve 28, being confined in such shifting movement by the upper and lower sides 39 of the opening. The clutch dog 38 is shiftable inwardly by a helical compression spring 40, the outer end of which engages the housing 33 and the inner end of which is disposed within a dog socket 41, engaging the inner portion of the latter. The clutch segment 38 is urged inwardly to place its internal downwardly facing ratchet teeth 42 into engagement with companion upwardly facing ratchet teeth 43 provided on the packer body 10, to prevent the body from moving upwardly relative to the clutch segment whenever the teeth are coengaged. The arcuate body teeth 43 form a longitudinal row of teeth which extend a substantial distance lengthwise of the body of the tool, so that the body can occupy a plurality of positions within the clutch sleeve 28 and clutch housing 33 and yet become coupled to the dog 38. The body 10 can shift downwardly freely, ratcheting along the clutch dog 38.

The clutch dog 38 is releasable from the body clutch teeth 43 whenever the body 10 is to be moved upwardly within the clutch sleeve 28 and clutch housing 33. It will be noted that the body ratchet teeth 43 extend only partially around the packer body 10. Between the ends of the arcuate body ratchet teeth, the packer body has a smooth or uninterrupted surface 45. Such smooth portion may be considered to be a cam or unclutching portion 45, the purpose of which is to cam or shift the clutch segment 38 radially outwardly and enable the body 10 to move longitudinally in both directions within the clutch segment or dog 38, the clutch sleeve 28 and the surrounding housing 33. Assuming the ratchet teeth 42, 43 to be coengaged, the clutch dog 38 can be released from the body ratchet teeth 43 by turning the body 10 of the packer to the right, or in a clockwise direction, until the cam or smooth portion 45 of the body engages the clutch segment 38 and shifts it radially outward and holds it in such radial outward position. Relative rotation of the body 10 to the left, or in a counter clockwise direction, will again place the ratchet teeth 43 in position to be engaged by the companion inner teeth 42 on the clutch segment 38, whereupon the clutch is in the engaged position.

Figure 4:
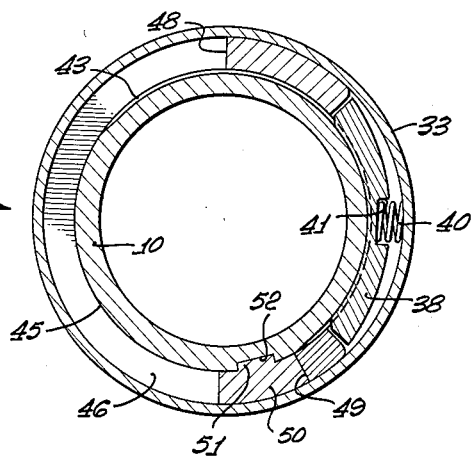
FIGURE 4 is an enlarged cross-section taken along the line 4—4 on FIGURE 1.

The location of the body ratchet teeth 43 in engagement with the clutch segment 38 or the smooth portion 45 in engagement with the clutch segment is determined positively. Thus, the clutch sleeve 28 has another extended arcuate opening 46, this opening having upper and lower sides 47 and terminating at stop shoulders 48, 49 provided by the stop sleeve. A key 50 is shiftable arcuately in the opening 46, this key having an inner projection 51 slidably received within a longitudinally extending keyway 52 in the packer body 10 to one side of its ratchet teeth 43. As disclosed most clearly in FIG. 4, when the body 10 has been turned to the left to place the key 50 in engagement with one of the sleeve stop shoulders 49, the body ratchet teeth 43 are disposed opposite the clutch segment 38, whereupon clutching engagement between the teeth can occur. Rotation of the body 10 in a clockwise direction will shift the key 50 arcuately in the same direction until it engages the other stop shoulder 48 at the other end of the opening 46, whereupon the cam or smooth portion 45 will be disposed in confronting relation to the clutch segment 38, insuring that the clutch segment is not in clutching position with respect to the body ratchet teeth 43. The body 10 can be turned to shift the key 50 between its positions of engagement against one stop shoulder or the other stop shoulder for different longitudinal positions of the body with respect to the clutch structure surrounding it. Such action is permitted because of the longitudinal extent of the groove 52 in which the inner portion 51 of the key 50 is disposed.

The ability of the clutch mechanism to be placed in its clutching or unclutching position is dependent upon the resistance to turning of the clutch sleeve 28 and housing 33 provided by the drag device 36a. Such drag device has the further purpose of resisting longitudinal movement of portions of the packer apparatus, such as the slip structure 23, 19, with respect to the body 10 of the tool, in order that the slips and packing 13 can be engaged with the well casing or released therefrom. The drag device 36a includes the drag body 36 which is slidably mounted upon and with respect to the packer body 10. As stated above, the lower portion of this drag body 34 is threadedly secured to the clutch housing 33, the upper part 55 of which may be considered as constituting a stop member or rim. The upper end 56 of the drag body may be tapered in an upward and inward direction to prevent the body 36 from hanging up on restrictions or coupling spaces in the well casing C while being moved upwardly therein. Between its upper and lower portions the drag body has a plurality of circumferentially spaced and longitudinally extending grooves 57, in each of which a drag block 58 is disposed and is radially slidable, the sides of the blocks being slidable along the sides of the groove 57. Each drag block 58 has a central longitudinal portion 59 adapted to frictionally bear against the wall of the well casing C, being urged outwardly against the well casing by a plurality of helical compression springs 60 disposed within sockets 61 in the central drag block portion, which is located within the longitudinal groove 57, the inner ends of the springs 60 bearing against the base 62 of the groove 57 and its outer end against the bases of the sockets.

From its central longitudinal portion 59 each drag lock tapers in an upward and inward direction, terminating in an upper stop member or terminal 63. Similarly, each drag block tapers from its central friction drag portion in a downward and inward direction terminating in a lower stop terminal 64. The upper stop terminal 63 is adapted to engage an upper stop rim or ring portion 65 of the drag body 36 and the lower stop terminal 64 is adapted to engage the lower stop rim or ring 55 provided by the upper end of the stop sleeve or clutch housing 33. The engagement of the terminals 63, 64 with the stop rims 65, 55 limits the extent of outward movement of each drag block 58 under the influence of the springs 60. When the apparatus is disposed within a well casing C, the drag blocks are shifted inwardly against the compressive force of the springs 60, to locate the stop terminals 63, 64 inwardly and away from the upper and lower stop rims 65, 55.

In the use of the apparatus specifically illustrated in the drawings, the packing sleeve 13 and slips 19 initially occupy their retracted positions, the body 10 being disposed relatively downward of the parts that surround it, and with the upper portion of its ratchet teeth 43 disposed opposite the clutch dog or segment 38. The apparatus is now inserted in the well casing C and is lowered downwardly therethrough by means of the tubular string D. During such downward movement the ratchet teeth 42, 43 need not necessarily be in a position to coengage, inasmuch as downward shifting of the body 10 tends to retain the packing sleeve 13 and the slips 19 in their retracted positions. However, as a precaution, it may be desirable for the ratchet teeth to be disposed opposite the clutch segment as determined by engagement of the key 50 with the stop shoulder 49. Accordingly, if the body 10 of the packer were to be shifted upwardly inadvertently to a substantial extent, the slips 19 and packing 13 would not be expanded against the well casing C. Upon insertion of the apparatus B in the well casing, the drag blocks 58 are forced inwardly of the body 36 against the action of the springs 60, being guided in such movement by the side walls of the longitudinal grooves 57.

Figure 5:
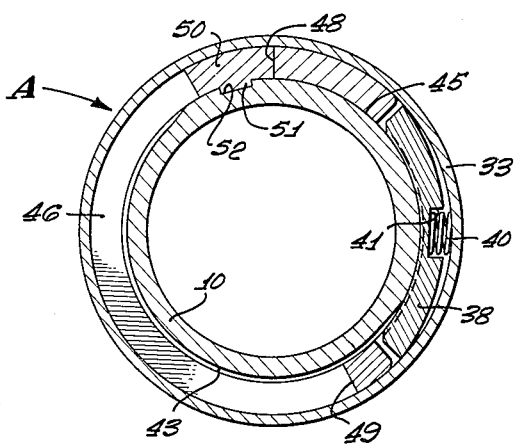
FIGURE 5 is an enlarged cross-section taken along the line 5—5 on FIGURE 2.
Figure 6:
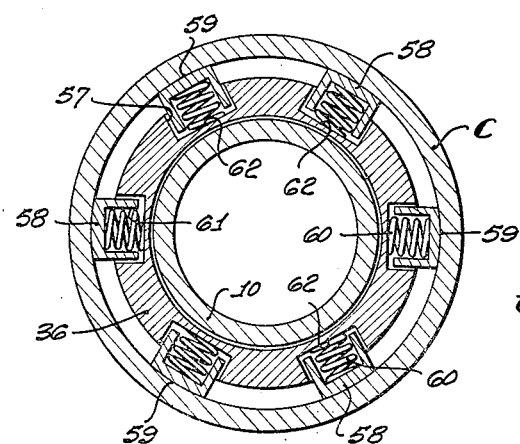
FIGURE 6 is a cross-section taken along the line 6—6 on FIGURE 2.

The apparatus is now lowered in the well casing, a shoulder 80 on the packer body 10 engaging the ring 15 to force the expander 14 downwardly, such downward movement of the expander being transmitted through the tongue and groove connection 22, 21 to the slips 19, which are in a retracted positon, pulling the latter downwardly, which, in turn, exert a pull upon the sl p ring 23, clutch sleeve 28, the clutch housing 33 and the drag body 36, which will force the drag blocks 58 downwardly along the wall of the well casing C, the drag blocks sliding frictionally along such wall. When the location in the casing is reached at which the packer B is to be set, the tubular string D and body 10 are turned in a right hand d rection. In view of the frictional resistance to turning offered by the drag blocks 58 against the well casing C, the drag body 36, clutch housing 33 and clutch sleeve 28 are prevented from turning, the body 10 turning until its cam or smooth portion 45 engages the clutch segment 38 and shifts it in a radial outward direction against the force of the segment spring 40. The body will turn unt l its key 50 engages the other stop shoulder 48, which definitely locates the entire smooth cam portion 45 opposite the clutch segment 38 which is the unclutching position of the apparatus (FIG. 5).

With the parts in such position, the tubing string D and the packer body 10 are now elevated, the frictional engagement of the drag blocks 58 aga nst the well casing resisting and preventing upward movement of the parts that surround the body 10. Upward movement of the body will first engage the lower guide or abutment 11 with the lower end of the packing sleeve 13, shifting the latter upwardly, which will also shift the expander 14 upwardly within the slips 19, the latter being prevented from moving upwardly by being coupled to the drag assembly 36a. Upward movement of the expander 14 will occur to the extent at wh ch it expands the slips 19 outwardly into anchoring engagement with the well casing C. A continuation of the upward movement of the body 10 will now move the lower abutment 11 toward the expander 14 or upper abutment, to foreshorten the packing sleeve 13 and compress it into sealing engagement with the wall of the well casing C. The well packer has now been anchored in packed-off position with the well casing C, so that fluid under pressure can now be pumped down through the tubular str ng D and the packer body 10 for the performance of the desired operation in the well bore. The pressure below the apparatus will act upwardly on the packing structure 13 tending to seal it more firmly against the wall of the well casing C, and also exerting an upward force on the expander 14 to wedge it more firmly behind the slips 19 to embed their wickers in the casing, thereby insuring aga nst upward shifting of the packer in the well casing by the hydraulic forces acting thereon from below.

When the packer parts are to be retracted, all that is necessary to do is to shift the tubing string D and body 10 downwardly. The friction drag assembly 36a engages the wall of the well casing C to res st downward movement of the clutch mechanism A surrounding the body 10 and the slip 19. Accordingly, the body 10 will move downwardly to shift the lower abutment 11 away from the expander 14 allowing the packing structure 13 to retract inherently to its initial position. The body shoulder 80 will then engage the ring 15 attached to the expander 14 through the threaded coupling 16, to move the expander 14 downwardly relat ve to the slips 19, downward movement of the latter still being resisted by the friction of the drag block device against the casing C. In view of the tongue and groove connection between the expander 14 and slips 19, the slips are shifted to their retracted position.

The body 10 of the tool can now be turned to the left, to dispose its ratchet teeth 43 once again oppos te the clutch segment 38 as determined by engagement of the key 50 with the other stop shoulder 49, whereupon the apparatus can be elevated in the well bore, the clutch teeth 42, 43 coengaging and coupling the body 10 through the segment 38 to the clutch sleeve 28 and clutch housing 33, which is connected to the drag body 36. The entire apparatus is now elevated in the well casing C, and may be removed entirely therefrom, the drag blocks 58 sliding fr ctionally against the wall of the well casing during such elevation of the apparatus.

The inventor claims:

1. In a well tool for operation in a well bore: a body member connectible to a running-in string for moving the tool within the well bore; a clutch member slidable longitudinally on said body member; one of said members having a plurality of clutch teeth disposed along the length of said one member and about a portion of its circumference; a clutch element on the other of said members having clutch teeth adapted to mesh with said other clutch teeth to couple said members for longitudinal movement together when said members occupy one relative posit on; said one member having a smooth surface extending alongside said clutch teeth on said one member about another portion of its circumference and movable into engagement with said clutch element upon relative angular movement between said members to another relative position to uncouple said members from each other, the teeth on sa d clutch element being circumferentially displaced from the teeth on said one member when the members occupy said another relative position, whereby said clutch element teeth and teeth on said one member are prevented from meshing with each other.

2. In a well tool adapted for operation in a well bore: a body member connectible to a running-in string for moving the tool w thin the well bore; a clutch member slidable longitudinally on said body member; one of said members having a plurality of one-way ratchet teeth disposed along the length of said one member; a clutch element on the other of said members and having companion one-way ratchet teeth adapted to mesh with said other ratchet teeth to couple said members for longitudinal movement together when sa d members occupy one relative position; said one member having a smooth surface extending alongside said ratchet teeth on said one member about another portion of its circumference and movable into engagement with said clutch element upon relative angular movement between said members to another relat ve position to uncouple said members from each other, the teeth on said clutch element being circumferentially displaced from the teeth on said one member when the members occupy said another relative position, whereby said clutch element teeth and teeth on said one member are prevented from meshing with each other.

3. In a well tool for operation in a well bore: a body member connectible to a running- n string for moving the tool within the well bore; a clutch member slidable longitudinally on said body member; one of said members having a plurality of clutch teeth disposed along the length of said one member and about a portion of its circumference; a clutch element on the other of said members having clutch teeth adapted to mesh w th said other clutch teeth to couple said members for longitudinal movement together when said members occupy one relative position; said one member having a smooth surface extending alongside said clutch teeth on said one member about another portion of its circumference and movable into engagement w th said clutch element upon relative angular movement between satid members to another relative position to uncouple said members from each other, the teeth on said clutch element being circumferentially displaced from the teeth on said one member when the members occupy said another relative position, whereby said clutch element teeth and teeth on sa d one member are prevented from meshing with each other; and locating means for selectively positioning said members in said one relative position or in said another relative position.

4. In a well tool adapted for operation in a well bore: a body member connectible to a running-in string for moving the tool within the well bore; a clutch member slidable longitudinally on said body member; one of said members having a plurality of one-way ratchet teeth disposed along the length of said one member; a clutch element on the other of said members and having companion one-way ratchet teeth adapted to mesh with said other ratchet teeth to couple said members for longitudinal movement together when said members occupy one relative position; said one member having a smooth surface extending alongside said ratchet teeth on said one member about another portion of its circumference and movable into engagement with said clutch element upon relative angular movement between said members to another relative position to uncouple said members from each other, the teeth on said clutch element being circumferentially displaced from the teeth on said one member when the members occupy said another relative position, whereby said clutch element teeth and teeth on said one member are prevented from meshing with each other; and locating means for selectively positioning said members in said one relative position or in said another relative position.

5. In a well tool adapted for operation in a well bore: a body member connectible to a running-in string for moving the tool within the well bore; a clutch member slidable longitudinally on said body member; one of said members having a plurality of clutch teeth disposed along the length of said one member and about a portion of its circumference; a clutch element movable laterally on the other of said members and having clutch teeth adapted to mesh with said other clutch teeth to couple said members for longitudinal movement together when said members occupy one relative position; said one member having a smooth surface extending alongside said clutch teeth on said one member about another portion of its circumference and movable into engagement with said clutch element upon relative rotation between said members to another relative position to uncouple said members from each other, the teeth on said clutch element being circumferentially displaced from the teeth on said one member when the members occupy said another relative position, whereby said clutch element teeth and teeth on said one member are prevented from meshing with each other, said clutch element moving laterally of said members in being shifted from a position in engagement with said clutch teeth on said one member to a position in engagement with said smooth surface.

6. In a well tool adapted for operation in a well bore: a body member connectible to a running-in string for moving the tool within the well bore; a clutch member slidable longitudinally on said body member; one of said members having a plurality of clutch teeth disposed along the length of said one member and about a portion of its circumference; a clutch element movable laterally on the other of said members and having clutch teeth adapted to mesh with said other clutch teeth to couple said members for longitudinal movement together when said members occupy one relative position; said one member having a smooth surface extending alongside said clutch teeth on said one member about another portion of its circumference and movable into engagement with said clutch element upon relative rotation between said members to another relative position to uncouple said members from each other, the teeth on said clutch element being circumferentially displaced from the teeth on said one member when the members occupy said another relative position, whereby said clutch element teeth and teeth on said one member are prevented from meshing with each other, said clutch element moving laterally of said members in being shifted from a position in engagement with said clutch teeth on said one member to a position in engagement with said smooth surface; and locating means for selectively positioning said members in said one relative position or in said another relative position.

7. In a well tool adapted for operation in a well bore: a body member connectible to a running-inn string for moving the tool within the well bore; a clutch member slidable longitudinally on said body member; said body member having a plurality of clutch teeth disposed along the length of said body member and about a portion of its circumference; a clutch element movable laterally on said clutch member and having clutch teeth adapted to mesh with said other clutch teeth to couple said members for longitudinal movement together when said members occupy one relative position; said body member having a smooth surface extending alongside said clutch teeth on said body member about another portion of its circumference and movable into engagement with said clutch element upon relative angular movement between said members to another relative position to uncouple said members from each other, the teeth on said clutch element being circumferentially displaced from the teeth on said body member when said members occupy said another relative position, whereby said clutch element teeth and body member teeth are prevented from meshing with each other.

8. In a well tool adapted for operation in a well bore: a body member connectible to a running-in string for moving the tool within the well bore; a clutch member slidable longitudinally on said body member; said body member having a plurality of one-way ratchet clutch teeth disposed along the length of said body member and about a portion of its circumference; a clutch element on said clutch member and having one-way ratchet teeth companion to and adapted to mesh with said other clutch teeth to couple said members for longitudinal movement together when said members occupy one relative position; said body member having a smooth surface extending alongside said ratchet teeth on said body member about another portion of its circumference and movable into engagement with said clutch element upon relative angular movement between said members to another relative position to uncouple said members from each other, the teeth on said clutch element being circumferentially displaced from the teeth on said body member when said members occupy said another relative position, whereby said clutch element teeth and body member teeth are prevented from meshing with each other.

9. In a well tool adapted for operation in a well bore: a body member connectible to a running-in string for moving the tool within the well bore; a clutch member slidable longitudinally on said body member; said body member having a plurality of clutch teeth disposed along the length of said body member and about a portion of its circumference; a clutch element movable laterally on said clutch member and having clutch teeth adapted to mesh with said other clutch teeth to couple said members for longitudinal movement together when said members occupy one relative position; said body member having a smooth surface extending alongside said clutch teeth on said body member about another portion of its circumference and movable into engagement with said clutch element upon relative angular movement between said members to another relative position to uncouple said members from each other, the teeth on said clutch element being circumferentially displaced from the teeth on said body member when said members occupy said another relative position, whereby said clutch element teeth and body member teeth are prevented from meshing with each other; and locating means for selectively positioning said members in said one relative position or in said another relative position.

10. In a well tool adapted for operation in a well bore: a body member connectible to a running-in string for moving the tool within the well bore; a clutch member slidable longitudinally on said body member; said body member having a plurality of one-way ratchet clutch teeth disposed along the length of said body member and about a portion of its circumference; a clutch element on said clutch member and having one-way ratchet teeth companion to and adapted to mesh with said other clutch teeth to couple said members for longitudinal movement together when said members occupy one relative position; said body member having a smooth surface extending alongside said ratchet teeth on said body member about another portion of its circumference and movable into engagement with said clutch element upon relative angular movement between said members to another relative position to uncouple said members from each other, the teeth on said clutch element being circumferentially displaced from the teeth on said body member when said members occupy said another relative position, whereby said clutch element teeth and body member teeth are prevented from meshing with each other; and locating means for selectively positioning said members in said one relative position or in said another relative position.

References Cited in the file of this patent

UNITED STATES PATENTS

| | | |
|---|---|---|
| 2,633,917 | Baker et al. | Apr. 7, 1953 |
| 2,751,017 | Baker et al. | June 19, 1956 |
| 2,802,534 | Conrad | Aug. 13, 1957 |